United States Patent [19]

Vora et al.

[11] Patent Number: 5,101,005
[45] Date of Patent: Mar. 31, 1992

[54] CROSSLINKABLE POLYIMIDES FROM BIS (AMINOPHENOXY) BENZONITRILES

[75] Inventors: Rohitkumar H. Vora, Westfield, N.J.; Dinesh N. Khanna, West Warwick, R.I.; Wolfgang K. Appel, Kelkheim, Fed. Rep. of Germany

[73] Assignee: Hoechst Celanese Corp., Somerville, N.J.

[21] Appl. No.: 348,633

[22] Filed: May 18, 1989

[51] Int. Cl.$^5$ .................... C08G 63/00; C08G 69/26; C08G 69/42
[52] U.S. Cl. .................. 528/183; 528/188; 528/229; 528/352; 528/353; 427/385.5
[58] Field of Search ............... 528/183, 353, 352, 229, 528/188; 427/385.5

[56] References Cited

U.S. PATENT DOCUMENTS 3,763,211 10/1973 Heath et al. ................ 558/418
4,742,152 5/1988 Scda ...................... 528/353
4,877,653 10/1989 Vora et al. ................ 427/385.5

OTHER PUBLICATIONS

T. M. Keller, *Polymer Communications*, 28, 1987, pp. 337–339.
W. B. Alston, in "Bicentennial of Materials," Eighth Annual SAMPE Technical Conference, 8, 1976, pp. 114–131.

*Primary Examiner*—John Kight, III
*Assistant Examiner*—P. Hampton-Hightower
*Attorney, Agent, or Firm*—James L. McGinnis

[57] ABSTRACT

The present invention provides cross-linkable polyimide polymers having at least one repeating unit of the sturcture of:

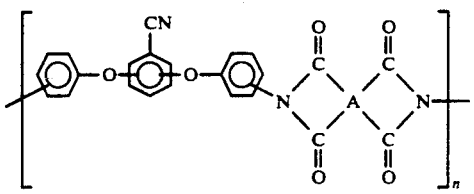

wherein n is the number of repeating groups and A is a tetravalent aromatic organic radical wherein each pair of carbonyl groups are attached to adjacent carbons in the ring moiety A.

It has been found that polyimides having the structure of formula I may be crosslinked at surprisingly low temperatures when heated from about 75 to about 110° C. to form infusible and solvent resistant shapes, thereby rendering them useful in the preparation of films, laminates and composites where inertness to solvents is a prerequisite.

7 Claims, No Drawings

CROSSLINKABLE POLYIMIDES FROM BIS (AMINOPHENOXY) BENZONITRILES

BACKGROUND OF THE INVENTION

1. Field of the Invention

This invention relates to polyimides and polyamic acid precursors thereof which may be thermally crosslinked and which exhibit improved thermooxidative stability and processing properties.

2. Description of Related Art

Polyimides are widely used in the aero-space industry and in the electronics industry because of their toughness, low density, thermal stability, radiation resistance and mechanical strength. Polyimides based on the polymer condensation product of aromatic diamines and dianhydrides containing a hexafluoroisopropylidene linking group are disclosed, for example, in U.S. Pat. Nos. 3,356,648, 3,959,350 and 4,592,925. These polyimides may be produced by first preparing a polyamic acid by reacting the diamine and dianhydride in a suitable solvent to produce the polyamic acid, followed by cyclization of the polyamic acid to the polyimide.

U.S. Pat. No. 3,763,211 teaches the preparation of bis(aminophenoxy) benzonitrile monomers such as 2,6-di(4-aminophenoxy) benzonitrile and suggests the use thereof in the preparation of polyamide or polyimide polymers by reaction with an aromatic acid chloride or an aromatic dianhydride respectively.

Polyimides such as prepared above are either soluble or swellable in many common organic solvents such as toluene, n-methyl-pyrrolidone, acetone, methyl ethyl ketone, diglyme, gamma-butyrolactone, propylene glycol methyl ether and like materials. While this property of solubility can be advantageous in certain applications such as solution spinning, spray coating and the preparation of polymer films by casting, it can also be a detriment in certain applications where the surface of the polyimide must be cleaned or otherwise treated with organic solvents after application to a substrate, or where composites and shaped articles come into contact with solvents or fuels. For example, polyimides are commonly used in flexible printed circuitry applications wherein the film is laminated to a backing such as copper, then coated with a photoresist, exposed and etched. Often times the polyimide surface must first be cleaned with organic solvents to remove dust and other impurities prior to the application of the resists, such as disclosed in U.S. Pat. No. 3,833,436. Such a treatment can result in a cracking or partial dissolution of the soluble or swellable polyimide which will detract from the effectiveness of the polyimide as an insulating or dielectric layer. In addition, composite articles or shaped parts used in the aircraft industry (fuel tank liners, for example) must be inert to solvents used in their cleaning and to fuels with which they may come in contact.

Accordingly, it is an object of this invention to provide a method for rendering coatings, films, composites and other articles based on solvent soluble or swellable polyimides insoluble after application to a surface or after shaping.

It is also an object of this invention to prepare crosslinkable polyimides derived from aromatic dianhydrides containing the hexafluoroisopropylidene linking group.

SUMMARY OF THE INVENTION

The present invention provides cross-linkable polyimide polymers having at least one repeating unit of the structure of formula I:

I:

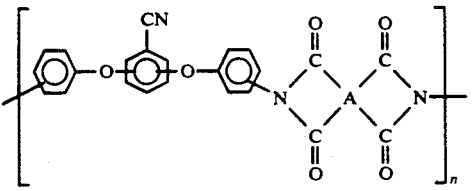

wherein n is the number of repeating groups and A is a tetravalent aromatic organic radical wherein each pair of carbonyl groups are attached to adjacent carbons in the ring moiety A.

It has been found that polyimides having the structure of formula I may be crosslinked at surprisingly low temperatures when heated from about 75° to about 110° C. to form infusible and solvent resistant shapes, thereby rendering them useful in the preparation of films, laminates, and composites where inertness to solvents is a prerequisite.

DETAILED DESCRIPTION OF THE INVENTION

Preferred polyimides of formula I are prepared by forming the polyimide polymer condensation product of one or more aromatic dianhydrides with one or more aminophenoxy benzonitriles having the formula

II:

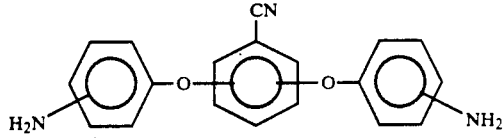

Preferred benzonitriles are those wherein the NH$_2$ radicals are ortho, para or meta to the neighboring oxygen atom and the oxygen atoms are in the 2,4-or 2,6-positions with respect to the CN radical. The most preferred benzonitriles for the purposes of this invention are 2,6-di(4-aminophenoxy) benzonitrile and 2,4-di(4-aminophenoxy) benzonitrile.

With respect to the dianhydride reactant used in forming the polyimides of this invention, most preferably the residuum A in formula I comprises a phenylene, naphthalene or a bis phenylene type compound, all of which may be unsubstituted or ring substituted with halogen, hydroxy, lower C$_1$ to C$_6$ alkyl or lower C$_1$ to C$_6$ alkoxy. The more preferred dianhydrides are pyromellitic dianhydride and diphenyl dianhydrides having the nuclear structure:

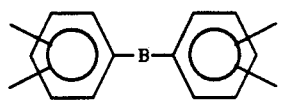

wherein B is selected from the group consisting of SO$_2$, O, S, CO, C$_1$ to C$_6$ alkyl, C$_1$ to C$_6$ alkoxy, perfluoroalkyl or perfluoroarylalkyl having from 1 to 10 carbon atoms or a carbon-carbon bond directly linking the two aromatic groups. In the most preferred embodiment of this invention, B is a hexafluoroisopylidine group (CF$_3$—C—CF$_3$) or a 1-phenyl-2,2,2-trifluoroethane group (CF$_3$—C—phenyl). Illustrative of tetracarboxylic acid dianhydrides which are suitable for use in the present invention are:

1,2,4,5-benzene tetracarboxylic acid dianhydride;
1,2,3,4-benzene tetracarboxylic acid dianhydride;
1,4-bis(2,3-dicarboxyphenoxy) benzene dianhydride;
1,3-bis(3,4-dicarboxyphenoxy) benzene dianhydride;
1,2,4,5-naphthalene tetracarboxylic acid dianhydride;
1,2,5,6-naphthalene tetracarboxylic acid dianhydride;
1,4,5,8-naphthalene tetracarboxylic acid dianhydride;
2,3,6,7-naphthalene tetracarboxylic acid dianhydride;
2,6-dichloronaphthalene-1,4,5,8-tetracarboxylic acid dianhydride;
15 2,7-dichloronaphthalene-1,4,5,8-tetracarboxylic acid dianhydride;
2,3,6,7-tetrachloronaphthalene-1,4,5,8-tetracarboxylic acid dianhydride;
3,3',4,4'-diphenyl tetracarboxylic acid dianhydride;
2,2',3,3'-diphenyl tetracarboxylic acid dianhydride;
4,4'-bis(3,4-dicarboxyphenoxy)diphenyl dianhydride;
bis(2,3-dicarboxyphenyl) ether dianhydride;
4,4'-bis(2,3-dicarboxyphenoxy) diphenyl ether dianhydride;
4,4'-bis(3,4-dicarboxyphenoxy) diphenyl ether dianhydride;
bis(3,4-dicarboxyphenyl) sulfide dianhydride;
4,4'-bis(2,3-dicarboxyphenoxy) diphenyl sulfide dianhydride;
4,4'-bis(3,4-dicarboxyphenoxy) diphenyl sulfide dianhydride;
bis(3,4-dicarboxyphenyl) sulfone dianhydride;
4,4'-bis(2,3-dicarboxyphenoxy) diphenyl sulfone dianhydride;
4,4'-bis(3,4-dicarboxyphenoxy) diphenyl sulfone dianhydride;
3,3',4,4'-benzophenone tetracarboxylic acid dianhydride;
2,2',3,3'-benzophenone tetracarboxylic acid dianhydride;
2,3,3',4'-benzophenone tetracarboxylic acid dianhydride;
4,4'-bis(3,4-dicarboxyphenoxy) benzophenone dianhydride;
bis(2,3-dicarboxyphenyl) methane dianhydride;
bis(3,4-dicarboxyphenyl) methane dianhydride;
1,1-bis(2,3-dicarboxyphenyl) ethane dianhydride;
1,1-bis(3,4-dicarboxyphenyl) ethane dianhydride;
1,2-bis(3,4-dicarboxyphenyl) ethane dianhydride;
2,2-bis(2,3-dicarboxyphenyl) propane dianhydride;
2,2-bis(3,4-dicarboxyphenyl) propane dianhydride;
2,2-bis[4-(2,3-dicarboxyphenoxy) phenyl]propane dianhydride;
2,2-bis[4-(3,4-dicarboxyphenoxy) phenyl]propane dianhydride;
4-(2,3-dicarboxyphenoxy)-4'-(3,4-dicarboxyphenoxy) diphenyl-2,2-propane dianhydride;
2,2-bis[4-(3,4-dicarboxyphenoxy-3,5-dimethyl) phenyl]-propane dianhydride;
2,3,4,5-thiophene tetracarboxylic acid dianhydride;
2,3,4,5-pyrrolidine tetracarboxylic acid dianhydride;
2,3,5,6-pyrazine tetracarboxylic acid dianhydride;
1,8,9,10-phenanthrene tetracarboxylic acid dianhydride;
3,4,9,10-perylene tetracarboxylic acid dianhydride;
2,2-bis(3,4-dicarboxyphenyl) hexafluoropropane dianhydride;
1,3-bis(3,4-dicarboxyphenyl) hexafluoropropane dianhydride;
1,1-bis(3,4-dicarboxyphenyl)-1-phenyl-2,2,2-trifluoroethane dianhydride;
2,2-bis[4-(3,4-dicarboxyphenoxy) phenyl]hexafluoropropane dianhydride;
1,1-bis[4-(3,4-dicarboxyphenoxy) phenyl]-1-phenyl-2,2,2-trifluoroethane dianhydride;
4,4'-bis[2-(3,4-dicarboxyphenyl)hexafluoroisopropyl]-diphenyl ether dianhydride,
and mixtures thereof.

One skilled in the art will recognize that the tetracarboxylic acids and acid-esters of the above-listed dianhydride compounds may also be used to produce the polyimides. These tetracarboxylic acids or derivatives thereof are available or may be prepared by known methods. For example, U.S. Pat. No. 3,847,867 to Heath et al. and U.S. Pat. No. 4,650,850 to Howson, which are incorporated herein by reference, show the preparation of bis(ether anhydrides) and bis(dialkyl aromatic ether anhydrides), respectively. The preparation of fluorine-containing dianhydrides is disclosed in U.S. Pat. No. 3,310,573 to Gordon and U.S. Pat. No. 3,649,601 to Critchley et al., which are also incorporated herein by reference.

The most preferred polyimides of this invention are prepared employing the following dianhydrides: 1,2,4,5-benzene tetracarboxylic acid dianhydride (also known as pyromellitic dianhydride-PMDA), bis(3,4-dicarboxy-phenyl) ether dianhydride (also known as oxyphthalic dianhydride-ODPA), 3,3',4,4'-benzophenone tetra-carboxylic acid dianhydride (also known as benzophenonetetracarboxylic dianhydride-BTDA), 3,3',4,4'-diphenyl tetracarboxylic acid dianhydride (BPDA), 2,2-bis(3,4-dicarboxyphenyl) hexafluoropropane dianhydride (6FDA), and 4,4'-bis[2-(3,4-dicarboxyphenyl) hexafluoroisopropyl] diphenyl ether dianhydride (12 FDA).

Crosslinkable polyimides within the scope of this invention may also be prepared using a mixture of the aminophenoxy benzonitrile of formula II with one or more other aromatic diamines having the formula:

NH$_2$—D—NH$_2$ wherein D is an aromatic moiety of a phenylene, naphthalene or bis-phenylene type compound which may be unsubstituted or ring substituted with halogen, hydroxy, C$_1$ to C$_6$ alkyl or C$_1$-C$_4$ alkoxy groups.

Illustrative of diamines which are suitable for use in a copolymerization admixture with the diamine of Formula I include:
m-phenylene diamine;
p-phenylene diamine;
1,3-bis(4-aminophenyl) propane;
2,2-bis(4-aminophenyl) propane;
4,4'-diamino-diphenyl methane;
2-bis(4-aminophenyl) ethane;
1,1-bis(4-aminophenyl) ethane;
2,2'-diamino-diethyl sulfide;
bis(4-aminophenyl) sulfide;
2,4'-diamino-diphenyl sulfide;
bis(3-aminophenyl)sulfone;
bis(4-aminophenyl) sulfone;
4,4 -diamino-dibenzyl sulfoxide;
bis(4-aminophenyl) ether;

bis(3-aminophenyl) ether;
bis(4-aminophenyl)diethyl silane;
bis(4-aminophenyl) diphenyl silane;
bis(4-aminophenyl) ethyl phosphine oxide;
bis(4-aminophenyl) phenyl phosphine oxide;
bis(4-aminophenyl)-N-phenylamine;
bis(4-aminophenyl)-N-methylamine;
1,2-diamino-naphthalene;
1,4-diamino-naphthalene;
1,5-diamino-naphthalene;
1,6-diamino-naphthalene;
1,7-diamino-naphthalene;
1,8-diamino-naphthalene;
2,3-diamino-naphthalene;
2,6-diamino-naphthalene;
1,4-diamino-2-methyl-naphthalene;
1,5-diamino-2-methyl-naphthalene;
1,3-diamino-2-phenyl-naphthalene;
4,4'-diamino-biphenyl;
3,3'-diamino-biphenyl;
3,3'-dichloro-4,4'-diamino-biphenyl;
3,3'-dimethyl-4,4'-diamino-biphenyl;
3,4'-dimethyl-4,4'-diamino-biphenyl;
3,3'-dimethoxy-4,4'-diamino-biphenyl;
4,4'-bis(4-aminophenoxy)-biphenyl;
2,4-diamino-toluene;
2,5-diamino-toluene;
2,6-diamino-toluene;
3,5-diamino-toluene;
1,3-diamino-2,5-dichloro-benzene;
1,4-diamino-2,5-dichloro-benzene;
1-methoxy-2,4-diamino-benzene;
1,4-diamino-2-methoxy-5-methyl-benzene;
1,4-diamino-2,3,5,6-tetramethyl-benzene;
1,4-bis(2-methyl-4-amino-pentyl)-benzene;
1,4-bis(1,1-dimethyl-5-amino-pentyl)-benzene;
1,4-bis(4-aminophenoxy)-benzene;
o-xylylene diamine;
m-xylylene diamine;
p-xylylene diamine;
3,3'-diamino-benzophenone;
4,4'-diamino-benzophenone;
2,6-diamino-pyridine;
3,5-diamino-pyridine;
1,3-diamino-adamantane;
bis[2-(3-aminophenyl)hexafluoroisopropyl]diphenyl ether;
3,3'-diamino-1,1,1'-diadamantane;
N-(3-aminophenyl)-4-aminobenzamide;
4-aminophenyl-3-aminobenzoate;
2,2-bis(4-aminophenyl) hexafluoropropane;
2,2-bis(3-aminophenyl) hexafluoropropane;
2-(3-aminophenyl)-2-(4-aminophenyl)hexafluoropropane;
2,2-bis[4-(4-aminophenoxy)phenyl]hexafluoropropane;
2,2-bis[4-(2-chloro-4-aminophenoxy)phenyl hexafluoropropane;
1,1-bis(4-aminophenyl)-1-phenyl-2,2,2-trifluoroethane;
1,1-bis[4-(4-aminophenoxy)phenyl]-1-phenyl-2,2,2-trifluoroethane;
1,4-bis(3-aminophenyl)buta-1-ene-3-yne;
1,3-bis(3-aminophenyl) hexafluoropropane;
1,5-bis(3-aminophenyl) decafluoropentane;
4,4'-bis[2-(4-aminophenoxyphenyl) hexafluoroisopropyl]diphenyl ether;
and mixtures thereof;

The most preferred polyimides of the present invention are those having at least one recurring group of the formula III:

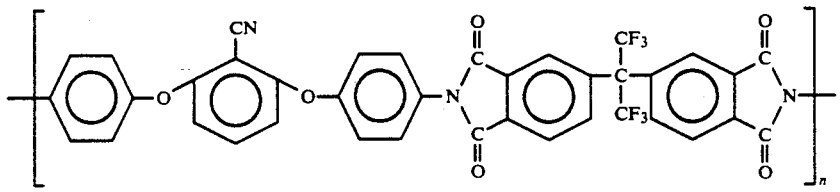

In the preferred embodiment, n is a number sufficient to provide an inherent viscosity of at least about 0.1 dl/g. as measured from a solution of the polymer in dimethylacetamide at 25° C. at a polymer concentration of 0.5 weight percent.

A preferred process for preparing the polyimides of this invention involves first preparing a polyamic acid by reacting the diamine and the dianhydride in an organic solvent, preferably under substantially anhydrous conditions for a time and at a temperature sufficient to provide at least 50% of the corresponding polyamic acid, and then converting the polyamic acid to the polyimide. Suitable conditions for reacting the diamine and the dianhydride are disclosed in detail in U.S. Pat. Nos. 3,356,648 and 3,959,350, both to Rogers, which are incorporated herein by reference. The intermediate polyamic acid may also be esterified to provide polyamide-esters.

In a preferred process for preparing the polyimides, electronic grade diamine and dianhydride (at least about 99.5% pure) may be reacted in N-methyl pyrrolidone, gamma-butyrolactone (BLO), or a mixture of BLO and another solvent such as diglyme. The resulting product is a polyamic acid which is then converted to the desired polyimide by one of several methods: heating the polyamic acid solution until imidization is substantially complete, or by combining the polyamic acid solution and a dehydrating agent such as acetic anhydride and beta-picoline with or without catalyst, and optionally heating the resulting mixture until imidization is substantially complete.

In the preferred embodiment of the invention, the diamine and the dianhydride components are reacted in approximately equimolar amounts.

As indicated above, the polyimides of this invention that are solvent soluble or swellable may be readily crosslinked and rendered inert to common organic solvents by subjecting shaped or fabricated articles containing the polymer to a thermal annealing process at a temperature of at least about 75° C. and for a period of time sufficient to insolubilize the polymer. The time required for effective crosslinking is a function of the crosslinking temperature, i.e., the lower the temperature the longer the time required for crosslinking to occur. For example, at temperatures of about 80° C., 12-16 hours is generally required for crosslinking. At temperatures of about 100° to 110° C. crosslinking may be carried out in as little as 8-10 hours. At 200° C., crosslinking can be effectuated in 4 hours. The exact crosslink mechanism is not known, but it is believed that a reaction of the cyano groups with either unreacted polymer end groups and/or oxygen is involved.

The ability of the polyimides of the present invention to be crosslinked at relatively low temperatures is particularly advantageous in applications where excessive processing heat is to be avoided, such as spin-coating applications for the electronic industry. This property leads to a reduction in the step baking temperatures required to produce a dried polyimide protective insulating film layer in such applications.

The polyimides of the present invention, either alone or in combination with other materials, may be shaped into useful articles by molding, extrusion, spinning, solution casting and other known processes prior to subjecting the material to the heat annealing process of the invention. In the case of films employed in electrical or electronic applications, a solution of the polyamic acid precursor may be spin coated onto a suitable substrate such as a silicon wafer, and then the coated article is subjected to a gradual heating cycle up to a temperature of about 300° to 350° C. to remove the solvent.

Other applications of the polyimides include other shaped articles such as molded parts, high temperature insulators, transparent fuel filter assemblies, seals, gaskets, thrustwashers, pipes of high thermal stability and corrosion resistance, high temperature and inert insulating, passivation and protective films, high strength-heat resistant fibers in tire cords, flame resistant clothing, ballistic protection vests, composite articles with other organic and/or inorganic fillers and fibers or in open fiber mats, as the impregnating material in laminates and in other applications obvious to the skilled artisan.

Advantageously fillers such as glass fibers, silica, molybdenum, graphite, and PTFE may be compounded or blended with the above specified polyimides to form molding and extrusion compositions.

In the preparation of laminates, a laminating varnish may be prepared by dissolving the above specified polyimides or polyamic acid precursors in a suitable solvent such as N-methylpyrrolidone, diglyme, dimethylformamide, propylene gylcol methyl ether, etc. The polyimide solution is then applied to a suitable reinforcing fabric such as a boron fiber fabric, a quartz fiber fabric, graphite or glass fabric and the solvent removed. A fused, crosslinked shaped part is formed using vacuum bag or autoclave laminating procedures. Similarly, these polyimides may be processed into fibers by melt or solution techniques and knitted or braided into a fabric or structural form which is then laminated with a reinforcing fabric of glass, boron, quartz or graphite, optionally with a laminating varnish, under heat and pressure. Similarly, glass, quartz, boron and graphite fibers may be mixed with a solution of these polyimides, the solvent removed by heat and optionally reduced pressure and the mixture fused and crosslinked into an article of the desired shape by the use of heat and pressure.

The following examples are illustrative of the invention.

EXAMPLE 1

This example details the preparation of 2,6-di(4-aminophenoxy) benzonitrile.

A 1000 ml reaction flask fitted with a thermometer and stirrer is dried and kept under a nitrogen blanket. The flask is charged with 400 ml dry dimethyl sulfoxide and the solvent purged with $N_2$ for 15 minutes. Then 48.6 g (0.35 mole) of 2,6-difluorobenzonitrile, and 81.8g (0.75 mole) of 4-aminophenol, are added. The clear solution is cooled in an ice bath and while the temperature is kept below 10° C., 30 g of a 60% suspension in mineral oil (0.75 mole), of sodium hydride, is added in portions. The reaction mixture is then stirred for 12 hrs. at 50°-60° C., filtered and, after cooling to room temperature, the product is precipitated by pouring into 1500 ml of water. The product is isolated by suction filtration, washed with water and dried. Pure product is obtained after two recrystallizations from ethyl acetate in an overall yield of 92g (81% of theory) and has an HPLC assay of 99%.

EXAMPLE 2

This example details the preparation of a polyamic acid polymer and polyimide polymer by condensing 2,2-bis(3,4-dicarboxyphenyl) hexafluoropropane dianhydride (6FDA) and 2,6 di-(4-aminophenoxy) benzonitrile (DAPB) of Example 1.

A 0.3-liter, 3-neck flask equipped with a condenser, thermometer, stirrer and nitrogen purge blanket was charged with 6.15 g (0.02 moles) of DAPB and 20 g. of N-methyl pyrrolidone (NMP) under nitrogen atmosphere. The mixture was stirred at room temperature to obtain a clear solution. To this solution was added 8.88 g (0.02 moles) of electronic grade (99.9% pure) 6FDA. An additional 40 g of NMP was then added and the mixture was agitated for a period of 15 hours at a temperature of about 25°-30° C.

The resulting polyamic acid was found to have inherent viscosity of 0.63 dl/g measured at 0.5% by weight concentration in dimethylacetamide at 25 ° C.

To the polyamic acid solution was added 16.3g of acetic anhydride and 1.63 g. of beta-picoline to cyclize the polymer. The solution was allowed to agitate for about 22 hours whereupon the polyamic acid was cyclized to the polyimide. The resulting polymer was precipitated in methanol, isolated by filtration and re-washed with methanol. This polymer has the chemical structure set forth in formula III above.

The resulting polymer which was soluble in DMAC was crosslinked by the following process. A 20% solution of the polymer in DMAC was cast on a metal base and allowed to dry in a vacuum oven at 30° C. for a period of 18 hours. The resulting film was then heated to 80° C. in a vacuum oven for about 20 hours, after which time it was additionally heated at 125° C. for 4 hours. The resulting cured polyimide film was found to be insoluble in DMAC and other common organic solvents in which the non-crosslinked polyimide was previously soluble.

EXAMPLE 3

The process Example 2 was repeated as set forth therein except that the reactants consisted of 3.08g (0.01 mole) of DAPB and 2.20 (0.01 mole of pyromellitic dianhydride (PMDA). The polyamic acid intermediate was cyclized using a mixture of 5.75 g of acetic anhydride and 0.6 g of beta picoline as dehydrating agents.

EXAMPLE 4

The process of Example 2 was repeated as set forth therein except that the reactants consisted of 3.08 g(0 01 mole) of DAPB and 2.20 g (0.01 mole) of 3, 3'4, 4, diphenyl tetracarboxylic acid dianhydride (BPDA). The resulting polyamic acid was cyclized using a mixture of 7.00 g of acetic anhydride and 0.7 g of beta-picoline as dehydrating agents.

EXAMPLE 5

The process of Example 2 was repeated as set forth therein except that the reactants consisted of 3.08 g (0.01 mole) of DAPB and 3.27 g (0.01 mole) of benzophenone tetracarboxylic acid dianhydride (BTDA). The polyamic acid intermediate was cyclized using a mixture of 7.5 g of acetic anhydride and 0.75 g. of beta-picoline.

EXAMPLE 6

The process of Example 2 was repeated as set forth therein except that the reactants consisted of 3.08 g (0 01 mole) of DAPB and 3.12 g (0.01 mole) of bis(3,4-dicarboxyphenyl) ether dianhydride (ODPA). The polyamic acid intermediate was cyclized using a mixture of 7.1 g of acetic anhydride and 0.7 g of beta-picoline.

Films of the polymers of examples 3-6 were prepared, dried and crosslinked as set forth in Example 2. After crosslinking, all samples were insoluble in DMAC.

The inherent viscosity of each of the polyamic-acid polymers produced in Examples 2-6 is reported in Table 1. Glass transition temperatures of the polyimides as measured by differential scanning caloremetry (DSC) are also reported in the table. Also reported is Thermogravametric Analysis (TGA) of the polyimides, setting forth the temperature at which each polymer recorded a 5% weight loss in air.

What is claimed is:

1. A method for crosslinking a polyimide polymer having at least one repeating unit of the structure:

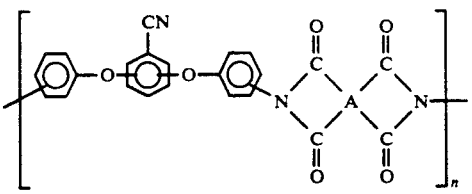

wherein A is a tetravalent aromatic organic radical wherein each pair of carbonyl groups are attached to adjacent carbon atoms in the ring moiety A and n is a number sufficient to provide an inherent viscosity of at least about 0.1 dl/g as measured from a solution of the polymer in dimethylacetamide at 25° C. at a polymer concentration of 0.5 weight percent, said method comprising forming said polyimide polymer into a shaped article and subjecting said shaped article to a temperature in the range of about 75° C. to about 200° C. for a period of time sufficient to crosslink said polymer.

2. The method of claim 1 wherein said polyimide has at least one repeating unit of the structure:

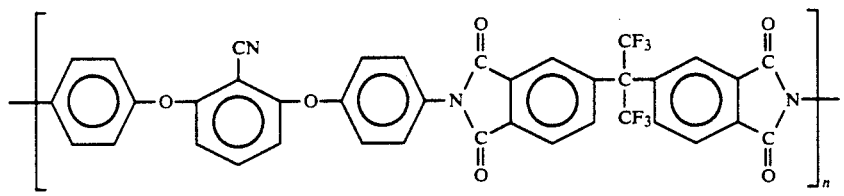

3. The method of claim 1 wherein A is the polyimide forming residuum of an aromatic dianhydride selected from the group consisting of:
1,2,4,5-benzene tetracarboxylic acid dianhydride, bis(3,4-dicarboxyphenyl) ether dianhydride, 3,3',4,4'-benzophenone tetracarboxylic acid dianhydride, 3,3',4,4'-diphenyl tetracarboxylic acid dianhydride, 2,2-bis(3,4-dicarboxyphenyl) hexa-

TABLE 1

| EXAMPLE | DIAMINE | DIANHYDRIDE | INH. VISC. (POLYAMIC ACID) | DSC Tg °C. | TGA 5% WT loss at °C. | COMMENTS |
| --- | --- | --- | --- | --- | --- | --- |
| 2 | EX 1 | 6FDA | 0.63 | 276 | 510 | POLYMER CROSSLINKED INSOL IN DMAC |
| 3 | EX 1 | PMDA | 0.72 | 260 | 515 | POLYMER CROSSLINKED INSOL IN DMAC |
| 4 | EX 1 | BPDA | 0.84 | 263 | 530 | POLYMER CROSSLINKED INSOL IN DMAC |
| 5 | EX 1 | BTDA | 1.11 | 260 | 520 | POLYMER CROSSLINKED INSOL IN DMAC |
| 6 | EX 1 | ODPA | 0.92 | 258 | 525 | POLYMER CROSSLINKED INSOL IN DMAC |

This invention has been described by way of the above specification and illustrative examples and it is to be understood that it is not limited to the specific embodiments thereof except as defined by the following claims.

fluoropropane dianhydride, and 4,4'-bis[2-(3,4-dicarboxyphenyl) hexafluoroisopropyl]diphenyl ether dianhydride.

4. The method of claim 1 wherein A has the structure:

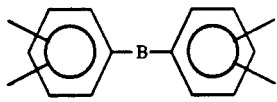

wherein B is selected from the group consisting of $SO_2$, O, CO, S, $C_1$ to $C_6$ alkyl, $C_1$ to $C_6$ alkoxy, perfluoroalkyl or perfluoroarylalkyl having from 1 to 10 carbon atoms, or a carbon-carbon bond directly linking the two aromatic groups.

5. The method of claim 4 wherein B is

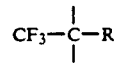

and R is $CF_3$ or phenyl.

6. The method of claim 5 wherein R is $CF_3$.

7. Crosslinked polyimides prepared by the method of claim 1.

* * * * *